United States Patent [19]

Wahlmann et al.

[11] Patent Number: 4,518,201
[45] Date of Patent: May 21, 1985

[54] REAR SEAT FOR USE IN A MOTOR VEHICLE

[75] Inventors: Ernst Wahlmann; Karl-Heinz Klausing, both of Meerbeck, Fed. Rep. of Germany

[73] Assignee: P.A. Rentrop Hubbert & Wagner Fahrzeugausstattungen GmbH & Co. KG, Fed. Rep. of Germany

[21] Appl. No.: 467,209

[22] Filed: Feb. 17, 1983

[30] Foreign Application Priority Data

Feb. 22, 1982 [DE] Fed. Rep. of Germany ....... 3206293

[51] Int. Cl.³ .............................. B60N 1/06
[52] U.S. Cl. ................................ 297/316; 296/65 R; 297/321; 297/322; 297/336; 297/334; 297/354
[58] Field of Search ............... 297/316, 317, 320, 321, 297/322, 324, 331, 335, 336, 354, 355; 296/65 R

[56] References Cited

U.S. PATENT DOCUMENTS 4,268,086 5/1981 Okuyama ..................... 297/317 X
4,390,205 6/1983 Levis ............................. 297/324 X

FOREIGN PATENT DOCUMENTS 190544  8/1956 Austria ............................... 297/317
2950314 6/1981 Fed. Rep. of Germany ...... 297/354
726797  6/1932 France ............................... 297/316
57530   5/1981 Japan ................................. 297/354

Primary Examiner—Victor N. Sakran
Assistant Examiner—Peter R. Brown
Attorney, Agent, or Firm—Penrose Lucas Albright

[57] ABSTRACT

A rear seat for a motor vehicle includes a seat part and a back rest pivoted to the seat part. The seat is mounted so that it can be moved between an inoperative position, in which the seat part and back rest are folded together and positioned approximately parallel to the back rest of the vehicle's front seat, and several operative positions. The seat part is mounted to the floor of the vehicle by a first link. A second link is pivotally mounted at one end to the back rest and has a journal at the other end. A locking member is movable between a locking position in which it holds the journal pivotably to an adjacent part of the vehicle and an unlocked position in which the journal is released to allow the seat to be moved to its inoperative position.

9 Claims, 5 Drawing Figures

REAR SEAT FOR USE IN A MOTOR VEHICLE

BACKGROUND OF THE INVENTION

The invention relates to a motor vehicle rear seat. It is known for the seat part to be pivoted about a spindle mounted at the front portion of the seat part transversely of the direction of travel of the vehicle so that the seat part can be rotated about the spindle into an inoperative position wherein the seat part comes to rest substantially parallel with the back rest of the front seat and, since the back rest is articulated to the seat part, with the back rest folded down onto the seat face of the seat part. The space which is thus made available can be loaded with cases and the like.

It has been found that the space made available in this manner is not always sufficient. Also there is frequently the need to be able to adjust the rear seat to provide a comfortable sitting position, particularly for crippled, handicapped or sick occupants of the vehicle.

SUMMARY OF THE INVENTION

The present invention provides a rear seat for use in a motor vehicle having a front seat including a back rest, said rear seat including a seat part having front and rear portions, a back rest articulated to said rear portion of said seat part, a spindle extending transversely adjacent said front portion of said seat part, a first link having two ends, said link being pivotally mounted at one of said ends to said spindle and pivotally mounted at the other of said ends to said front portion of said seat part, a second link having two ends, said second link being pivotally mounted at one said end to said back rest, a journal bearing mounted to the other said end of said second link, and a locking member movable between a locked and a released position, and mounted to the vehicle and adapted to secure said journal for rotation only when in its locked position, whereby when said locking member is in its released position said seat is able to adopt an inoperative position in which said seat part is substantially parallel to the back rest of the front seat.

DESCRIPTION OF A PREFERRED EMBODIMENT

Figure 1:
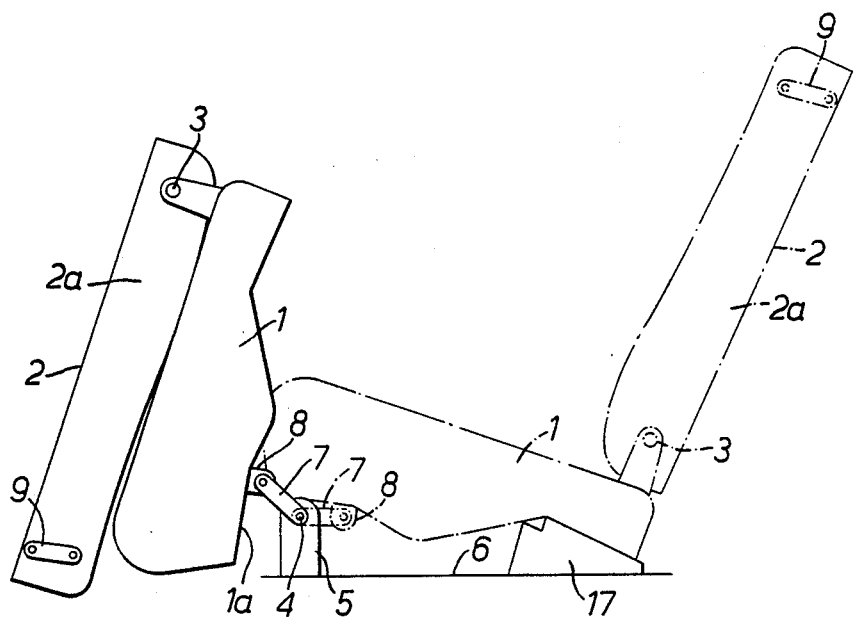
FIGS. 1, 2 and 3 are side views of a rear seat according to the invention in the inoperative position and in three different operative positions.

FIG. 1 of the drawings shows a motor vehicle rear seat having the seat part 1 and a back rest part 2. The parts 1 and 2 are connected to each other via hinges 3, one of which is disposed at each lateral side face 2a of the back rest 2.

Reference numeral 4 denotes a transverse spindle which is rotatably mounted in a bearing 5 which is fixed on the floor 6 of the vehicle. Only one bearing 5 is illustrated but more than one may be provided. The transverse spindle 4 is articulatingly connected via a first link 7 to a front portion of the seat part 1. As the drawing shows, this link 7 is disposed in a bearing 8 which is fixed on the underside 1a of the seat part 1. Several first links 7 may be provided although only one is shown.

Reference numeral 9 denotes a second link, one end of which is articulated to the back rest 2. Articulation is achieved via a journal 10. At its other end, the link 9 has a journal 11 connected thereto. Where the seat extends across the entire width of the vehicle a link 9 may be provided at each side.

Reference numeral 12 denotes the part of the vehicle superstructure which is disposed immediately adjacent the side face 2a of the back rest 2 and on which a locking member 13 is mounted. This locking member 13 is constructed as a two-armed lever which is pivotable about a journaled pivot pin 14. The pin 14 is fixed on a mounting 15 fixed on the part 12 of the vehicle superstructure which is immediately adjacent the side face 2a of the back rest 2.

The mount 15 has a mouth-shaped recess 15a into the lowest portion of which the journal 11 engages, in its locked position. One arm of the locking member 13 is formed in the shape of a hook which, in the locked position, engages over the journal 11 so that, by this engagement of the hook-shaped part of the locking member 13 over it, and by reason of the seating in the lowest position in the mouth-shaped recess 15a, the journal 11 is held as in a rotary mounting, when the locking member 13 in in its locked position.

An operating handle is disposed on the other arm of the locking member 13. This arm is subject to the action of a spring 16 which restores the locking member 13 to its locked position.

Figure 2:
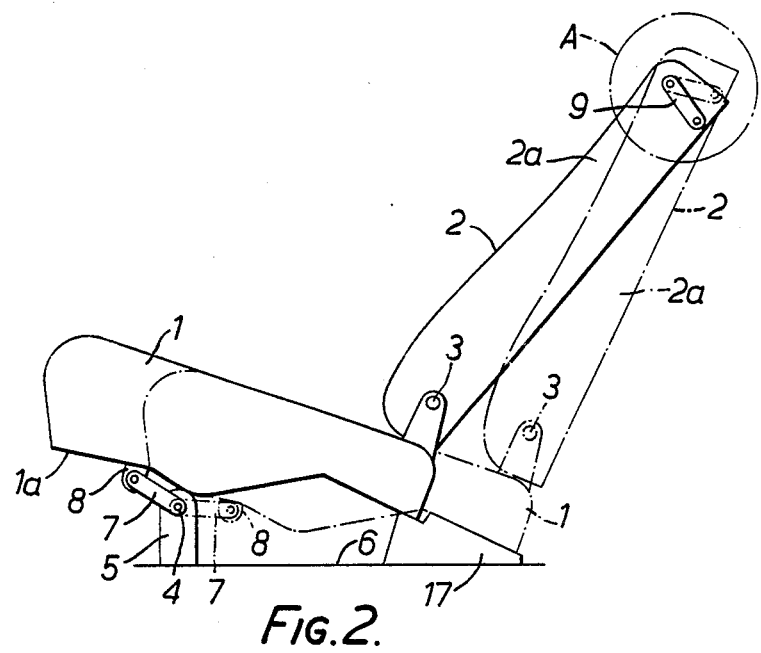
Figure 3:
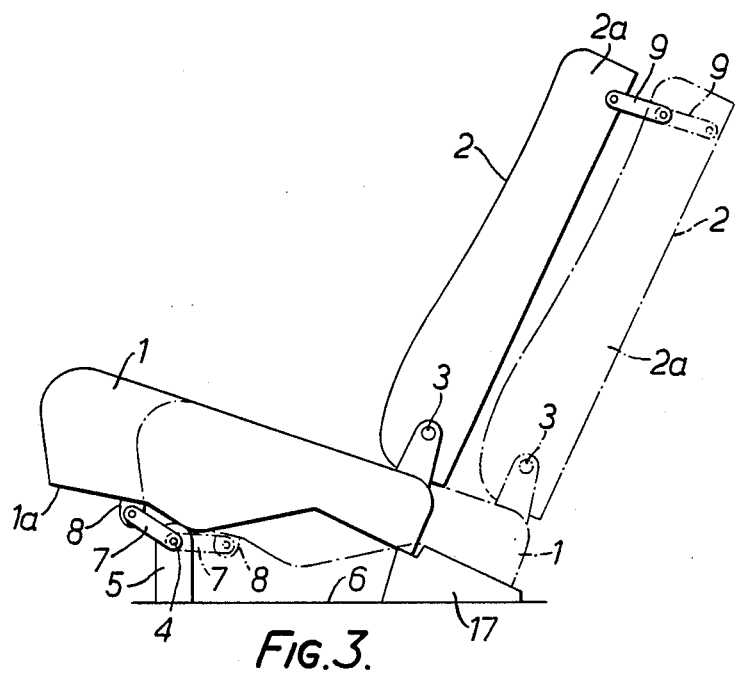

As FIGS. 2 and 3 show, the seat part 1, in the operative position, is braced against at least one rest 17 which is mounted on the floor 6 of the vehicle.

Figure 4:
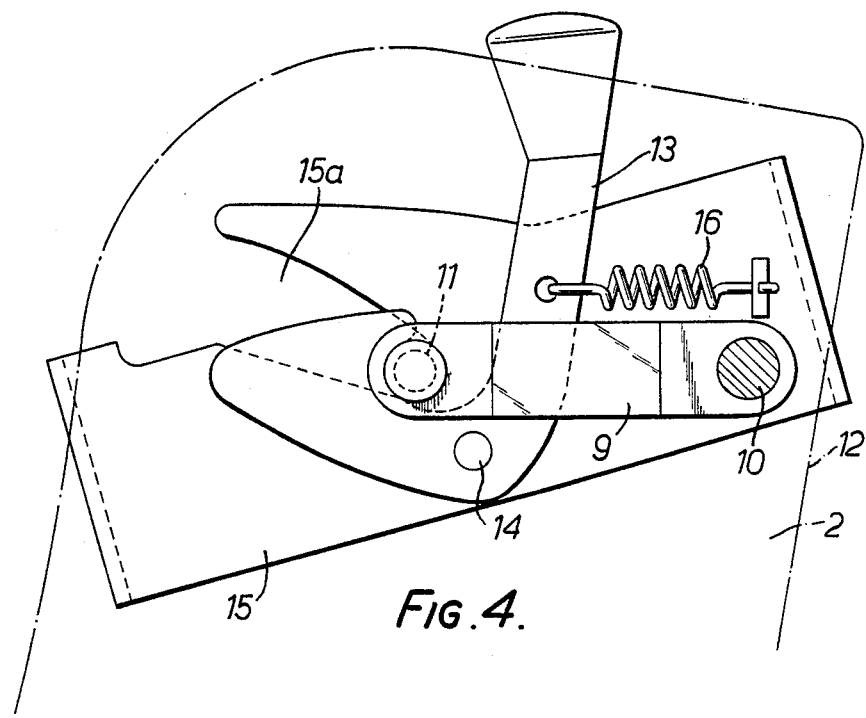
FIG. 4 is a view of the detail A in FIG. 2, on an enlarged scale.
Figure 5:
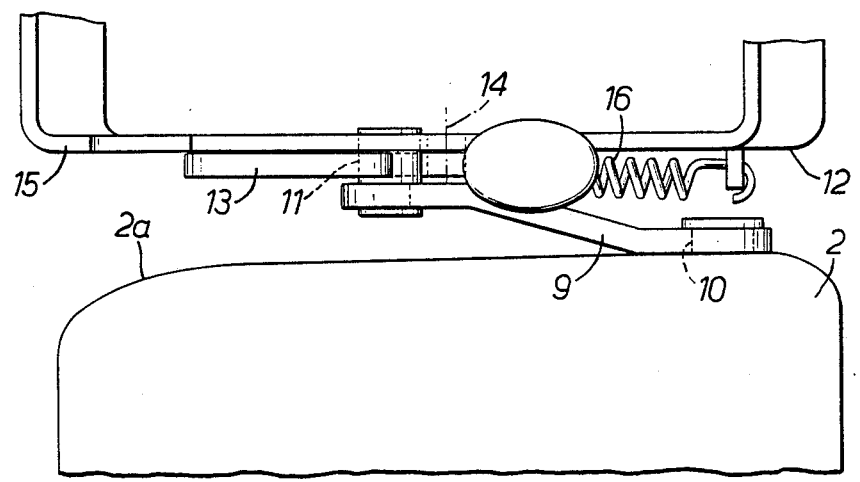
FIG. 5 is a partial plan view of the arrangement shown in FIG. 4.

In order to achieve that portion of the seat which is shown by a continuous line in FIG. 1 of the drawings, the locking member 13 is pivoted in an counterclockwise direction as seen in FIG. 4 so that the hook-shaped arm of the locking member releases the journal 11. During the pivoting movement of the seat part 1 in an anti-clockwise direction about the spindle 4, the journal 11 leaves the mouth-shaped recess 15a of the mount 15 and is thus free to move. The seat part 1 at the end of its pivoting movement then attains the position shown by a continuous line in FIG. 1 of the drawings, the back rest part 2 having its normally visible face resting on the support face of the seat part 1. The space in the vehicle which is now available behind the two parts 1 and 2 can be used as load space. Since, during pivoting movement of the seat part 1 and of the back rest 2, the link 7 also performs a pivoting movement, the parts 1 and 2 move forward also by about the length of the link 7, entirely in contrast to previously proposed arrangements in which the transverse spindle 4 lies in the mounting 8 and no such movement occurs.

The rear seat can also assume the position shown by a continuous line in FIG. 2 of the drawings, in which the seat part 1 is pushed a little forwards while the back rest 2 is inclined. This position is particularly favorable for fragile or older occupants of the vehicle who can relax in this position of the seat. In this position, the locking member 13 is in the locked position.

It is however also possible to achieve the position of the rear seat which is indicated in FIG. 3 of the drawings, in that the back rest 2 is so pivoted via the link 9 that it assumes a position approximately parallel to its original starting position. At the same time, the seat part 1 is also moved forwards during which the link 7 performs a pivoting movement about the spindle 4. In this position, the space available behind the back rest 2 is increased without any discernible sacrifice in terms of sitting comfort.

It will be appreciated that the above-described vehicle seat is simple and easy to operate and enables an efficient use to be made of the space behind the rear seat. The seat is additionally capable of being adjusted into a reclining operative position that is adapted to be particularly comfortable for crippled, handicapped or sick occupants of the seat, thereby enabling them to relax in the vehicle.

What we claim is:

1. A rear seat for use in a motor vehicle having a front seat including a back rest, said rear seat including
   a seat part having front and rear portions,
   a back rest articulated to said rear portion of said seat part,
   a spindle extending transversely adjacent said front portion of said seat part,
   a first link having two ends, said link being pivotally mounted at one of said ends to said spindle and pivotally mounted at the other of said ends to said front portion of said seat part,
   a second link having two ends, said second link being pivotally mounted at one said end to said back rest,
   a journal bearing mounted to the other said end of said second link, and
   a locking member movable between a locked and a released position, and mounted to the vehicle and adapted to secure said journal for rotation only when in its locked position, whereby when said locking member is in its released position said seat is able to adopt an inoperative position in which said seat part is substantially parallel to the back rest of the front seat.

2. A seat according to claim 1, further including at least one bearing in which said transverse spindle is mounted, the or each said bearing being mounted to the vehicle.

3. A seat according to claim 1, further including a bearing for said first link, which first link bearing is fixed on an underside of said seat part.

4. A seat according to claim 1, wherein said locking member includes a pivot pin mounted to the vehicle and a two-armed lever pivotal about said pivot pin.

5. A seat according to claim 4, including a mount secured to said vehicle to which said pivot pin is fixed.

6. A seat according to claim 5, wherein said mount defines a mouth-shaped recess having a closed lowest part, said journal being accommodated in said lowest part of said recess when said locking member is in said locked position.

7. A seat according to claim 4, wherein one arm of said two-armed lever is formed in the shape of a hook which when said locking member is in said locked position engages around said journal.

8. A seat according to claim 7, wherein said locking member includes an operating handle mounted on the other arm of said locking member lever, and a spring mounted at one end to said vehicle and at the other end to said other arm of the locking member to bias said locking member into said locking position.

9. A seat according to claim 1, including a rest mounted to said vehicle against which said seat part is braced when the seat is in use.

* * * * *